United States Patent
Kobashi et al.

(10) Patent No.: US 9,418,014 B2
(45) Date of Patent: Aug. 16, 2016

(54) STORAGE CONTROL DEVICE, STORAGE DEVICE, STORAGE SYSTEM, STORAGE CONTROL METHOD, AND PROGRAM FOR THE SAME

(71) Applicant: FUJITSU LIMITED, Kawasaki-shi, Kanagawa (JP)

(72) Inventors: Kazunori Kobashi, Yamato (JP); Hiroshi Murayama, Fuji (JP); Minoru Maeda, Nagoya (JP); Toshihide Yanagawa, Yokohama (JP); Keiichi Nakai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 13/963,404

(22) Filed: Aug. 9, 2013

(65) Prior Publication Data
US 2014/0052910 A1 Feb. 20, 2014

Related U.S. Application Data

(63) Continuation of application No. PCT/JP2011/052899, filed on Feb. 10, 2011.

(51) Int. Cl.
*G06F 12/08* (2016.01)
*G06F 3/06* (2006.01)
*G06F 11/20* (2006.01)

(52) U.S. Cl.
CPC .......... *G06F 12/0866* (2013.01); *G06F 3/0611* (2013.01); *G06F 3/0634* (2013.01); *G06F 3/0689* (2013.01); *G06F 11/2094* (2013.01)

(58) Field of Classification Search
CPC . G06F 11/3034; G06F 3/0653; G06F 3/0634; G06F 11/2094; G06F 12/0866; G06F 3/0611; G06F 3/0689; G06F 11/1469; G06F 11/1456; G06F 11/1076; H05K 999/99
See application file for complete search history.

(56) References Cited

U.S. PATENT DOCUMENTS 5,341,493 A * 8/1994 Yanai et al. .................. 711/161
5,493,670 A * 2/1996 Douglis et al. ............... 713/324
(Continued)

FOREIGN PATENT DOCUMENTS

| JP | 2000-293314 | 10/2000 |
|----|-------------|---------|
| JP | 2008-3719   | 1/2008  |

(Continued)

OTHER PUBLICATIONS

International Search Report mailed Apr. 19, 2011 in corresponding International Application No. PCT/JP2011/052899.
(Continued)

*Primary Examiner* — Jared Rutz
*Assistant Examiner* — Khoa D Doan
(74) *Attorney, Agent, or Firm* — Staas & Halsey LLP

(57) ABSTRACT

A storage control device configured to control a storage device includes a first disk which is in active state and a second disk which is in standby state. The storage control device includes a communication unit and a control unit. The communication unit transmits a read-out request or a write request to the storage device and receives a response to the read-out request or the write request from the storage device. The control unit controls the communication unit so that the communication unit transmits a rotation start command which instructs a start of rotation of the second disk to the storage device, when a time to the point when receiving the response to the read-out request or the write request transmitted to the first disk which is in active state is longer than a predetermined threshold.

11 Claims, 18 Drawing Sheets

(56) References Cited

U.S. PATENT DOCUMENTS

| | | | |
|---|---|---|---|
| 6,052,797 A * | 4/2000 | Ofek et al. | 714/6.23 |
| 6,583,947 B1 | 6/2003 | Hakamata et al. | |
| 6,799,283 B1 * | 9/2004 | Tamai et al. | 714/6.12 |
| 7,389,396 B1 * | 6/2008 | Goel et al. | 711/167 |
| 8,510,496 B1 * | 8/2013 | Totolos et al. | 711/5 |
| 8,589,655 B2 * | 11/2013 | Colgrove et al. | 711/167 |
| 8,639,971 B1 * | 1/2014 | White | G06F 11/3034 707/687 |
| 8,799,535 B2 * | 8/2014 | Hluchyj et al. | 710/52 |
| 8,990,496 B2 * | 3/2015 | Aizman et al. | 711/114 |
| 2003/0163655 A1 * | 8/2003 | McKean et al. | 711/154 |
| 2004/0128442 A1 * | 7/2004 | Hinshaw et al. | 711/114 |
| 2005/0097402 A1 * | 5/2005 | Baba | 714/42 |
| 2005/0114728 A1 * | 5/2005 | Aizawa et al. | 714/6 |
| 2005/0160221 A1 * | 7/2005 | Yamazaki et al. | 711/114 |
| 2005/0283655 A1 * | 12/2005 | Ashmore | 714/7 |
| 2006/0002246 A1 * | 1/2006 | Emberty et al. | 369/30.03 |
| 2006/0179209 A1 * | 8/2006 | Wang et al. | 711/101 |
| 2006/0206671 A1 * | 9/2006 | Aiello et al. | 711/148 |
| 2007/0061509 A1 * | 3/2007 | Ahluwalia et al. | 711/112 |
| 2007/0294477 A1 * | 12/2007 | Yanagawa et al. | 711/114 |
| 2007/0294552 A1 | 12/2007 | Kakihara et al. | |
| 2008/0007860 A1 * | 1/2008 | Miyata et al. | 360/69 |
| 2008/0024899 A1 * | 1/2008 | Chu et al. | 360/69 |
| 2008/0034155 A1 * | 2/2008 | Koga et al. | 711/114 |
| 2008/0126616 A1 * | 5/2008 | Kumasawa et al. | 710/42 |
| 2008/0126702 A1 * | 5/2008 | Zimoto et al. | 711/114 |
| 2008/0130156 A1 * | 6/2008 | Chu et al. | 360/71 |
| 2008/0148303 A1 * | 6/2008 | Okamoto et al. | 720/652 |
| 2008/0168223 A1 * | 7/2008 | Reeves et al. | 711/114 |
| 2008/0168226 A1 * | 7/2008 | Wang | 711/114 |
| 2009/0049240 A1 | 2/2009 | Oe et al. | |
| 2009/0125754 A1 * | 5/2009 | Chandra et al. | 714/7 |
| 2009/0177916 A1 * | 7/2009 | Tokoro | 714/6 |
| 2009/0235110 A1 * | 9/2009 | Kurokawa | 714/3 |
| 2009/0249104 A1 | 10/2009 | Ikeda et al. | |
| 2010/0057791 A1 * | 3/2010 | Schneider | G06F 17/30091 707/E17.01 |
| 2010/0057991 A1 * | 3/2010 | Yoshida et al. | 711/114 |
| 2010/0232048 A1 * | 9/2010 | Aida | 360/48 |
| 2010/0332750 A1 * | 12/2010 | Hooton | 711/114 |
| 2011/0185201 A1 * | 7/2011 | Kawakami et al. | 713/320 |
| 2011/0289331 A1 * | 11/2011 | Kobayashi et al. | 713/323 |
| 2012/0017127 A1 * | 1/2012 | Nagai et al. | 714/57 |
| 2012/0317354 A1 * | 12/2012 | Yokota | G06F 3/0625 711/113 |

FOREIGN PATENT DOCUMENTS

| | | |
|---|---|---|
| JP | 2009-48360 | 3/2009 |
| JP | 2009-187450 | 8/2009 |
| JP | 2009-238159 | 10/2009 |

OTHER PUBLICATIONS

Office Action issued Sep. 30, 2014 in corresponding Japanese Patent Application No. 2012-556716.

PCT International Search Report and Written Opinion of the International Searching Authority mailed Apr. 19, 2011 in corresponding International Patent Application No. PCT/JP2011/052899.

* cited by examiner

| VIRTUAL DISK LUN INFORMATION (LUN) | PHYSICAL DISK LUN INFORMATION (LUN、WWN) |
|---|---|
| 1 | 1, XXX00001 |
| 2 | 1, XXX00002 |
| ... | ... |

FIG. 8

| ACTIVE DISK RESPONSE DELAY TIME [SECOND] | ACTIVE DISK ABNORMAL TIME [SECOND] |
|---|---|
| 5 | 30 |

FIG. 9

| RAID NUMBER | STATE OF ACTIVE DISK | STATE OF STANDBY DISK A | STATE OF STANDBY DISK B |
|---|---|---|---|
| 1 | NORMAL | NORMAL | - |
| 2 | ABNORMAL | NORMAL | NORMAL |
| 3 | NORMAL | NORMAL | - |

FIG. 10

| STORING NUMBER | DATA DISK START ADDRESS | STANDBY DISK RAID GROUP NUMBER | STANDBY DISK NUMBER | START ADDRESS | DATA LENGTH |
|---|---|---|---|---|---|
| 1 | 1010 | 1 | 1 | 256 | 300 |
| 2 | 1310 | 1 | 1 | 1200 | 190 |
| 3 | 1500 | 1 | 1 | 800 | 300 |
| 4 | 1900 | 2 | 1 | 100 | 64 |
| 5 | : | : | : | : | : |

FIG. 11
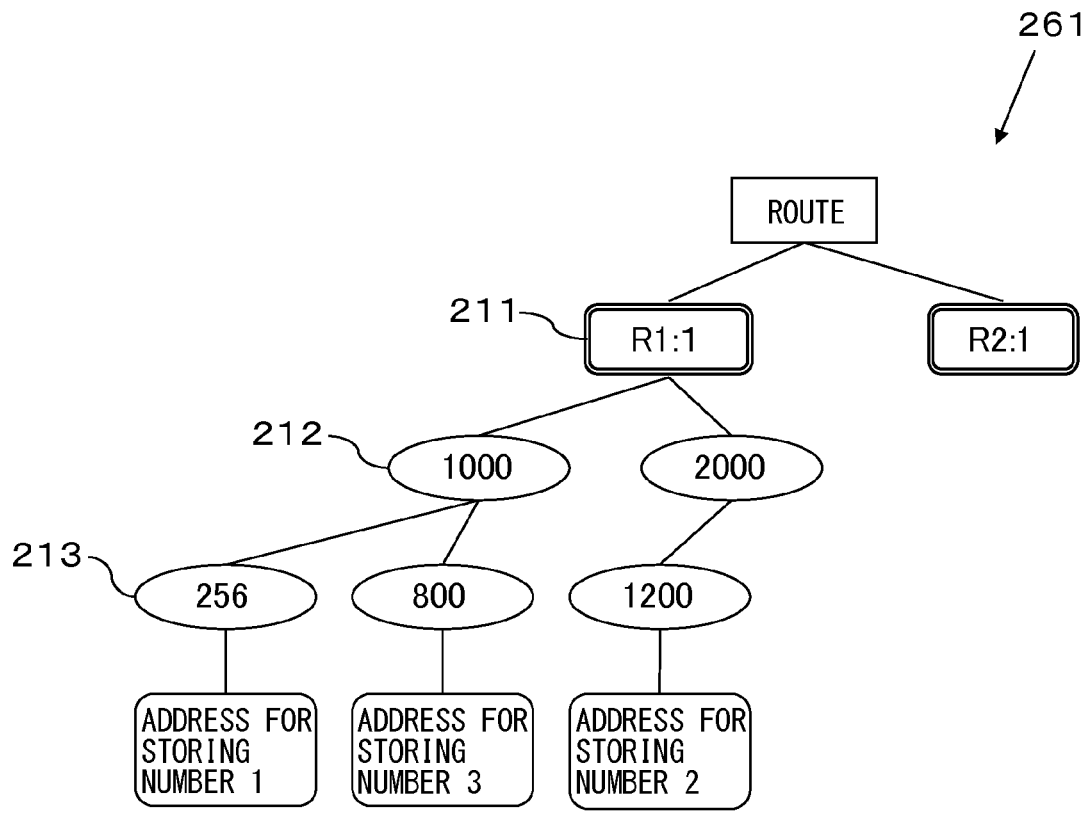
【EXPLANATORY NOTES】
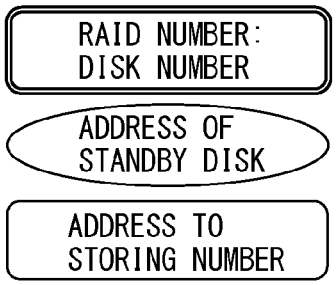

| RAID GROUP NUMBER | STANDBY DISK NUMBER | MAXIMUM CAPACITANCE [%] | IO TIME [SECOND] | COMMUNICATION PERIOD OF TIME |
|---|---|---|---|---|
| 1 | 1 | 50 | 90 | 1:00-3:00 |
| 1 | 2 | 50 | 90 | 1:00-3:00 |
| 1 | 3 | 50 | 90 | 1:00-3:00 |
| : | : | : | : | : | the data is read out. How-
STORAGE CONTROL DEVICE, STORAGE DEVICE, STORAGE SYSTEM, STORAGE CONTROL METHOD, AND PROGRAM FOR THE SAME

CROSS-REFERENCE TO RELATED APPLICATION

This application is a continuation application and is based upon PCT/JP2011/052899, filed on Feb. 10, 2011, the entire contents of which are incorporated herein by reference.

FIELD

The embodiments discussed herein are related to a storage control device, a storage device, a storage system, a storage control method, and a program for the same.

BACKGROUND

There is a technique which stops a rotation of a disk of a hard disk drive which is not used to reduce power consumption of a storage device. This technique stops a rotation of a disk to which an I/O (Input/Output) request does not exist during a predetermined period of time, and when an I/O request occurs to the disk in a state of rotation stop, a rotation of the disk is restarted to be a state in which the I/O is allowed to be performed.

However, when an I/O is performed to a disk in a state of rotation stop, a response of the I/O is not returned for a maximum of several minutes from a point when restarting a rotation of a disk to a point when the rotation of the disk becomes stable. Therefore, in related art, a rotation of a disk has not been stopped to a disk with high I/O frequency such as a disk used for an on-line business system, and a rotation of a disk has been stopped to a disk with low I/O frequency for a batch operation such as backup operation. Thereby, power consumption is reduced by stopping a rotation of a backup destination disk to which an I/O does not occur in a period other than a period of backup operation, and I/O to the disk which has stopped the rotation is performed by a batch operational to hide an influence of the waiting time of the I/O.

On the other hand, there is a technique which reduces power to a disk with high I/O frequency such as a disk used for an on-line business system. Such technique stops a rotation of a part of disks which are made redundant by using RAID (Redundant Arrays of Inexpensive Disks) and uses other disks.

Hereinafter, for the sake of illustration, a disk which is used in a normal operation is referred to as an "active disk", and a disk which stops rotation is referred to as a "standby disk". A non-volatile medium which temporarily stores write data while the standby disk stops is referred to as a "cache".

When a failure occurs on one of active disks which are made in redundant configuration, in order to read the data from a standby disk which is also made in redundant configuration, the standby disk is rotated, data written in the cache is reflected to the standby disk, and the data is read out. However, since it takes time to stabilize the rotation of the standby disk, it takes time to restart reading data.

Patent document 1: Japanese Laid-open Patent Publication No. 2009-187450
Patent document 2: Japanese Laid-open Patent Publication No. 2009-238159
Patent document 3: Japanese Laid-open Patent Publication No. 2009-048360

SUMMARY

According to an aspect of the embodiments, there is provided a storage device including a first disk which is in active state and a second disk which is in standby state. A storage control device includes: a communication unit which transmits a read-out request or a write request to the storage device and receives a response to the read-out request or the write request from the storage device; and a control unit which controls the communication unit so that the communication unit transmits a rotation start command which instructs a start of rotation of the second disk to the storage device, when a time to the point when receiving the response to the read-out request or the write request transmitted to the first disk which is in active state is longer than a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram depicting an example of disk control information.
FIG. 9 is a diagram depicting an example of disk state management information.
FIG. 10 is a diagram depicting an example of data map management information.
FIG. 11 is a diagram depicting an example of data map management information which includes data structure of B-tree.
FIG. 14 is a diagram depicting an example of cache reflection information.

DESCRIPTION OF EMBODIMENTS

A storage control device illustrated below controls a storage device including a plurality of disks. A storage control device receives an IO request from an external system with high I/O request frequency such as an on-line business system, and starts a rotation of a standby disk when a response of an active disk of the storage device is delayed to the IO request.

Hereinafter, [1] hardware configuration of a storage system, [2] sequence of data communications between the storage control device and the storage device, [3] standby disk control of the storage control device, [4] functions of the storage control device, [5] processing flow of the storage control device, and [6] modification of the storage device are illustrated in this order.

Hardware Configuration of Storage System

Figure 1:
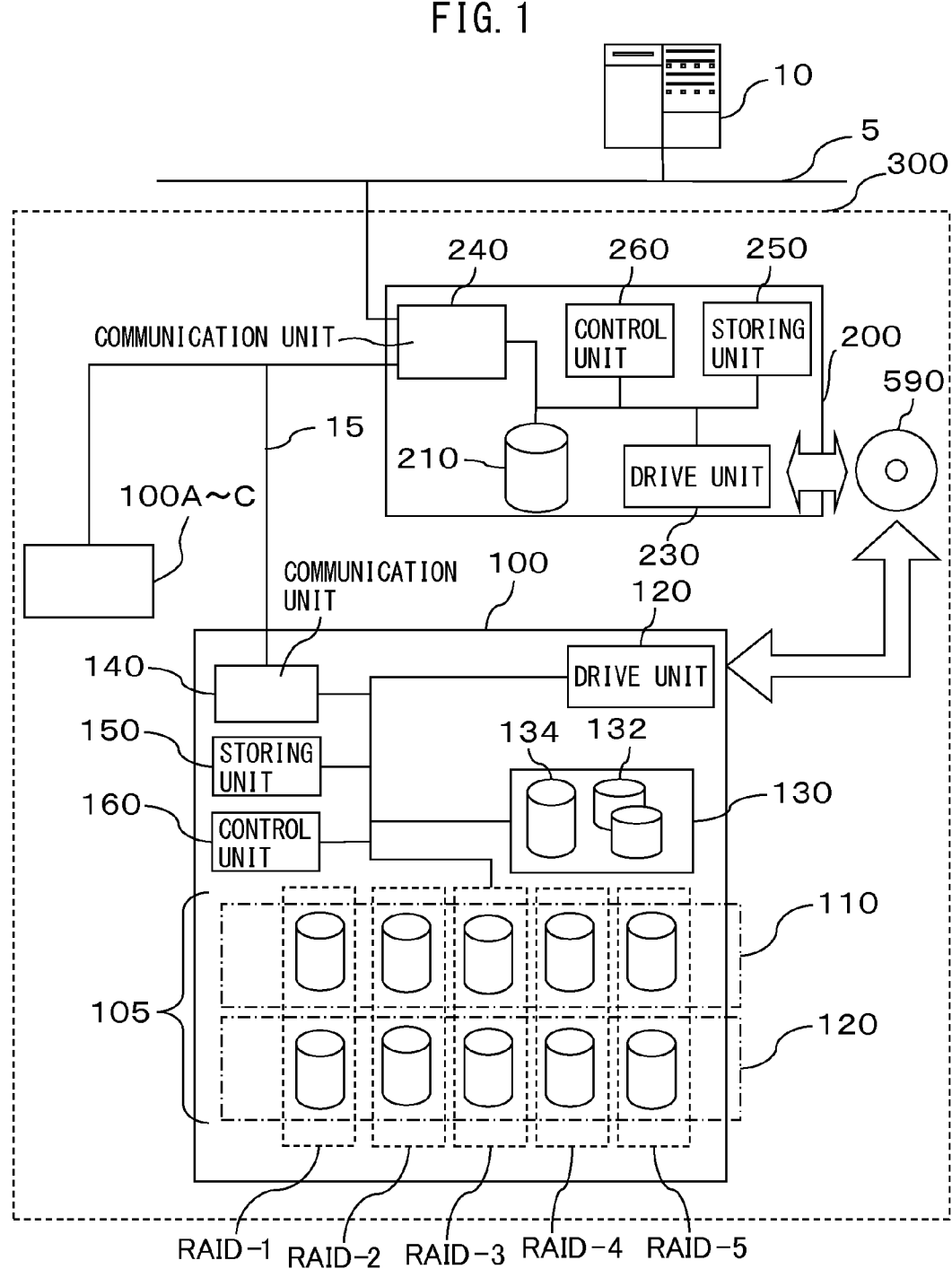
FIG. 1 is a diagram for illustrating a hardware configuration of a storage system.

FIG. 1 is a diagram for illustrating a hardware configuration of the storage system. A storage system 300 depicted in FIG. 1 includes a storage device 100 and a storage control device 200. Note that the storage device included in the storage system 300 is not limited to the storage device 100, and may include a plurality of storage devices which include the same functions as the storage device 100 and are indicated by 100A to 100C. The storage control device 200 is connected with an external system 10 through a network cable 5 such as Ethernet (registered trademark in Japan) cable, and is connected with the storage devices 100 and 100A to 100C through a network cable 15 such as FC-AL (Fibre Channel Arbitrated Loop). Since the storage devices 100A to 100C each include the same functions as the storage device 100, the following illustration for the storage device 100 is also applied to the storage devices 100A to 100C.

The storage device 100 and the storage control device 200 perform data communication with each other in accordance with an iSCSI (Internet Small Computer System Interface) protocol or the like. The storage control device 200 and the external system 10 also perform data communication with each other in accordance with the iSCSI protocol or the like.

[1.1] External System

The external system 10 is a system with high I/O request frequency to the storage device 100 such as the on-line business system. The external system 10 transmits the data which is an access object to the storage control device 200 by using a "read-out request" or a "write request", in which respective LUN (Logical Unit Number) and logical address are specified, as messages following the iSCSI protocol or the like. Hereinafter, the "read-out request" and the "write request" are referred to as an "access request", and "read-out" and "writing" are referred to as "access".

[1.2] Storage Control Device

The storage control device 200 includes an auxiliary storing unit 210, a drive unit 230, a communication unit 240, a storing unit 250, and a control unit 260. Respective units included in the storage control device 200 are connected by a bus.

Figure 2:
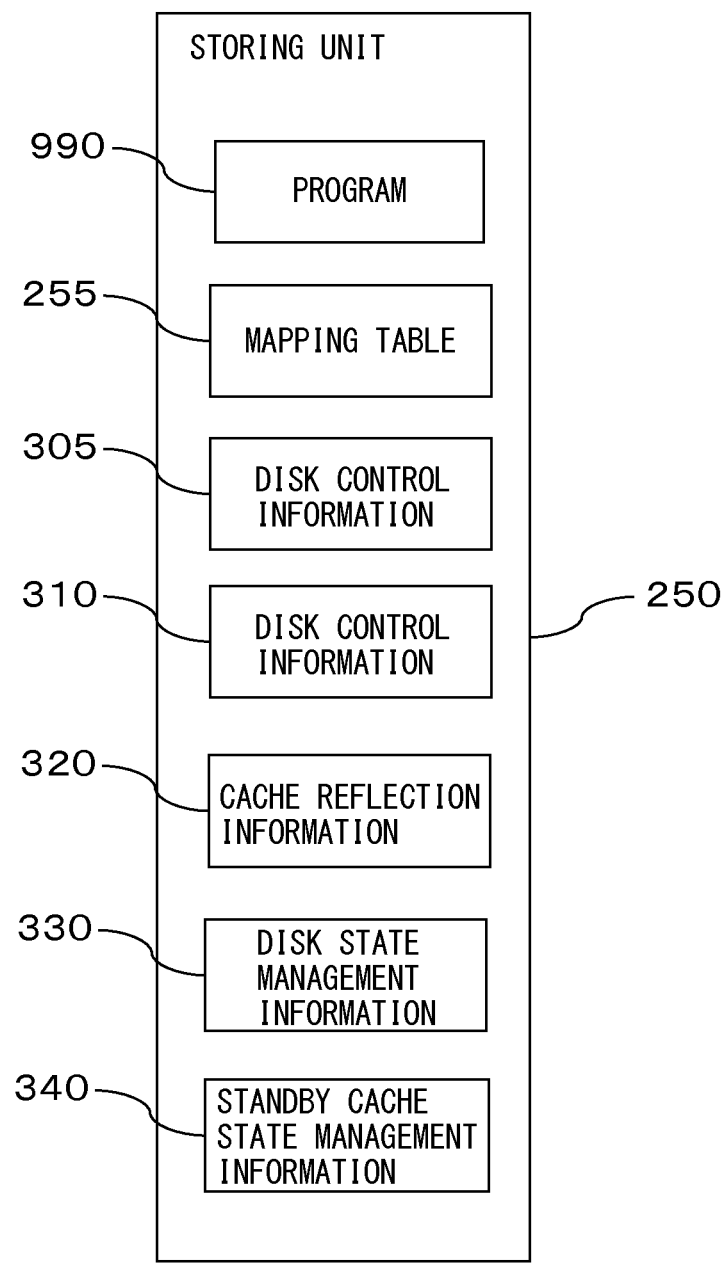
FIG. 2 is a diagram depicting an example of a memory map of a storing unit of a storage control device.

The storing unit 250 stores data and a program. The storing unit 250 is DRAM (Dynamic Random Access Memory), for example. FIG. 2 is a diagram depicting an example of a memory map of the storing unit of the storage control device. The storing unit 250 stores a mapping table 255, disk control information 310, cache reflection information 320, disk state management information 330, standby cache state management information 340, and a program 990.

The mapping table 255 will be illustrated below using FIG. 3. The control unit 260 includes an input-and-output control function, a cache management function, and a cache reflection function, which are realized by executing the program 990. These functions will be described below using FIG. 7. The disk control information 310, the cache reflection information 320, the disk state management information 330, and the standby cache state management information 340 will be described below using FIG. 8, FIG. 14, FIG. 9, and FIG. 12, respectively.

The control unit 260 executes the program stored in the storing unit 250 to control each unit. The control unit 260 is a CPU (Central Processing Unit), for example.

The auxiliary storing unit 210 is a non-volatile device which is able to hold information without power supply and stores the program and data stored in the storing unit 250. The auxiliary storing unit 210 is a disk array using a magnetic disk, an SSD (Solid State Drive) using a flash memory or the like.

The drive unit 230 is a device which reads from and writes to a recording medium 590, such as a floppy (registered trademark in Japan) disk, or a CD-ROM (Compact Disc Read Only Memory), a DVD (Digital Versatile Disc), for example. The drive unit 230 includes a motor rotating the recording medium 590 and a head which reads and writes data on the recording medium 590 and the like. Note that the recording medium 590 is able to store the program 990. The drive unit 230 reads the program 990 from the recording medium 590 which is mounted on the drive unit 230. The control unit 260 stores the program 990 read by the drive unit 230 into the storing unit 250 or the auxiliary storing unit 210.

The communication unit 240 is a circuit which communicates using the standard of a specific physical layer and data link layer in the Internet Protocol, or the Fibre Channel standard. When the communication unit 240 uses the Internet Protocol, a MAC address (Media Access Control address) is assigned to the communication unit 240. When the communication unit 240 communicates using the Fibre Channel, WWN (World Wide Name) is assigned to the communication unit 240.

The storage control device 200 is a device which virtualizes the storage device. The virtualization of the storage presents a virtual volume which is different from an actual volume to the external system 10, as if there is a single storage device instead of a plurality of storage devices 100 and 100A to 100C. For example, as for the read-out request to the storage device 100A and the read-out request to the storage device 100B, the external system 10 is able to recognize the storage control device 200 as a single storage device, and to access the device according to the LUN and the logical address. The virtualization of the storage device allows an extension of capacity when the existing storage device runs out of capacity and a usage by combining the storage devices of the different models.

The storage control device 200 stores, in the storing unit 250, a mapping table 255 for associating the positions of data between the virtual volume presented to the external system 10 and the actual volume on the storage device 100. The storage control device 200 performs a LUN conversion process between a physical LUN of the storage device 100, and a virtual LUN presented to the external system 10 with reference to the mapping table 255.

Figure 3:
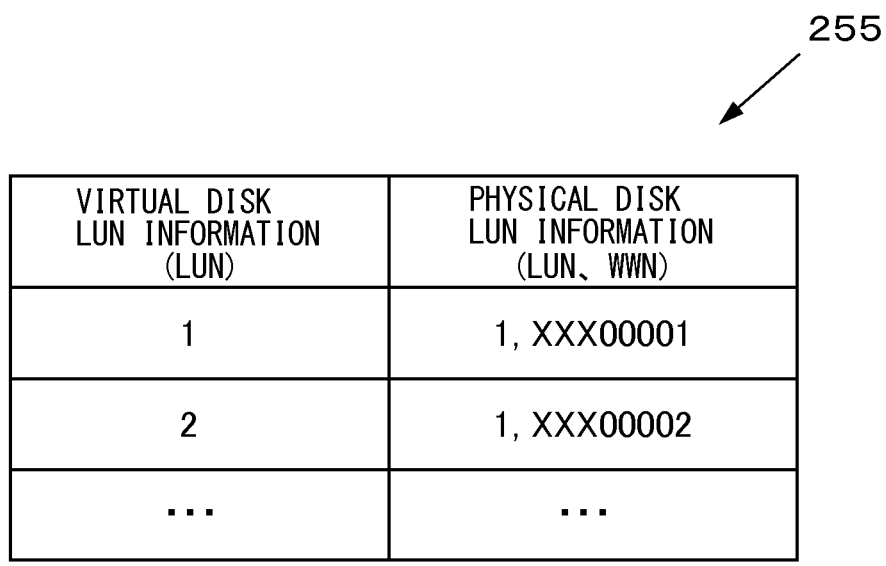
FIG. 3 is a diagram depicting an example of a mapping table.

FIG. 3 is a diagram depicting an example of the mapping table. The mapping table 255 is a table which defines a correspondence relation between virtual disk LUN information specified by the LUN, and physical disk LUN information specified by the LUN and the WWN. Since the WWN identifies the storage device, it is possible to associate the LUN of the virtual disk LUN information, and the LUN of the physical disk LUN information and the storage device by referring to the mapping table 255. Therefore, the storage control device 200 is able to associate the positions of data between the virtual volume and the actual volume on the storage device 100 by referring to the mapping table 255.

For example, the virtual disk LUN information LUN "1" corresponds to LUN "1" of the storage device 100A which has the physical disk LUN information "XXX00001". The virtual disk LUN information LUN "2" corresponds to LUN "1" of the storage device 100B which has the physical disk LUN information "XXX00002". The storage control device 200 transfers the access request by which the external system 10 targets LUN "1" to the storage device 100A, as an access request for LUN "1" of the storage device 100A. Moreover, the access request by which the external system 10 targets LUN "2" is transferred to the storage device 100B, as an access request for LUN "1" of the storage device 100B.

[1.3 Storage Device]

The storage device 100 includes a disk array unit 105, a drive unit 120, a standby cache 130, a communication unit 140, a storing unit 150, and a control unit 160. Respective units included in the storage device 100 are connected by a bus, and the control unit 160 executes the program stored in the storing unit 150 to control each unit.

The storing unit 150 stores data and a program. The storing unit 250 is DRAM, for example. The storing unit 150 stores the program 990 read from the recording medium 590. The program 990 read from the recording medium 590 is for realizing, by the storage control device 200 or the storage device 100, the input-and-output control function, cache management function, and cache reflection function of the storage control device 200.

The case in which the storage device 100 executes the program 990 corresponds to the case that, in the storage system 300, there is no storage control device 200 and the storage device 100 and the external system 10 are directly connected. In this case, in an example in which the storage system 300 does not include the storage control device 200, the storage device 100 realizes the above-mentioned functions. The hardware configuration of the storage system in this case will be described below using FIG. 19.

The control unit 160 executes the program stored in the storing unit 150 to control each unit. The control unit 160 is CPU, for example. The control unit 160 controls the communication unit 140 to transmit an abnormal signal to the storage control device 200, when an abnormality occurs on a disk of the disk array unit 105 or a disk of the standby cache 130 and the abnormality is notified, as described below.

The drive unit 230 is, for example, a device which reads from and writes to the recording media 590, such as CD-ROM and DVD. The drive unit 230 includes a motor to rotate the recording medium 590, a head which reads and writes data on the recording medium 590, and the like. The drive unit 120 reads a program from the recording medium 590 mounted on the drive unit 120. The control unit 160 stores the program read by the drive unit 120 in the storing unit 150.

The position of each disk included in the disk array unit 105 is identified by a RAID number and a disk number. The disk number is a serial number assigned to each disk which constitutes the RAID. The data in the disk is identified by the logical address. The disk array unit 105 includes an RAID controller, and the RAID controller performs a parity operation and a disk data management which distributes data to each disk according to RAID configuration. The RAID controller notifies the abnormality to the control unit 160 when the abnormality occurs on the disk.

Each disk included in the disk array unit 105 constitutes the RAID. In FIG. 1, a plurality of disks which constitute the RAID are illustrated as RAID-1 to RAID-5. The LUN may be assigned to a plurality of the RAID, without being assigned for each of a plurality of disks which constitute RAID, or may be assigned to some of a plurality of disks which constitute the RAID. Hereinafter, for the sake of the illustration, it is assumed that the LUNs are assigned to identify respective RAID-1 to RAID-5.

One of a plurality of disks which constitute the RAID is a standby disk, and other disks are active disks. The number of active disks depends on a type of RAID. The ratio of the number of active disks and the number of standby disks is allowed to be selected by a user of the storage system 300. However, the number of active disks in the RAID depends on the RAID level. Table 1 depicted below is a table which defines a correspondence relation between the RAID level and the number of active disks to a single standby disk.

TABLE 1

| RAID level | the number of active disks |
|---|---|
| 1 | 1 |
| 5 | the number of elements-1 |
| 6 | the number of elements-2 |

As depicted in Table 1, the number of active disks is 1 to a single standby disk, when the RAID level is set to 1, in other words, the disk is mirrored. When the RAID level is 5, the number of active disks is "the number of elements—1", the elements being the disks which constitute the RAID. When the RAID level is 6, the number of active disks is "the number of elements—2", the elements being the disks which constitute the RAID. In this way, the number of the active disks to a single standby disk changes in accordance with the RAID level. Since the effect of power saving is higher as the number of standby disks increases, the effect of power saving is the highest at the time of RAID level 1.

The standby cache 130 is a disk which caches the data to be written in the standby disk. The standby cache 130 notifies the control unit 160 of the abnormality, when the abnormality occurs on the disk. When the data is written on the active disk while the standby disk stops, the storing data in the standby disk and the storing data in the active disk become different from each other. The data written in the active disk while the standby disk is stopped is held at the standby cache 130, and when predetermined conditions are satisfied such that the storage capacity of the standby disk reaches a limit, the data held in the standby cache 130 is reflected into the standby disk. Note that that storage control device 200 transmits a cache reflection instruction to the storage device 100 with reference to the cache reflection information 320 which defines the conditions for reflecting the data stored in the standby cache 130 into the standby disk. The details of cache reflection information 320 will be described below using FIG. 14.

The standby cache 130 includes a data disk 132 and a meta-disk 134. The data disk 132 holds the data to be reflected to the standby disk. The data disk 132 does not store all the data of the standby disk but periodically reflects data to the standby disk, and thereby it is possible to reduce the storage capacity of the data disk 132, which does not include the same capacity as the capacity of the standby disk.

Note that the storing data to the data disk has variable length. This is because, when data is held by fixed length and a write request for an amount less than a unit of management (fixed length) is received, all data is to be written to the cache after changing some data stored in the active disk. When the data in the cache has variable length and some data in the active disk is changed, it is only necessary to store a changed part to the data disk. Therefore, in comparison with the case in which the storing data has fixed length, it is possible to decrease the number of times of the data reflection to the standby disk from the data disk, to reduce the amount of reflection data, and to reduce the storage capacity of the data disk.

In addition, the data stored in the standby cache 130 is first generation. The data stored in the data cache is reflected to the standby disk so that the data does not become a plurality of generations.

The data disk 132 holds the data to be written in the standby disk by a circular buffer manner. The meta-disk 134 stores data map management information which defines a correspondence relationship between the logical address in the data disk 132 and the logical address to the standby disk.

The storage control device 200 is able to determine where the data to be reflected in the standby disk is stored in the standby cache 130, by referring to the data map management information 261.

Figure 4:
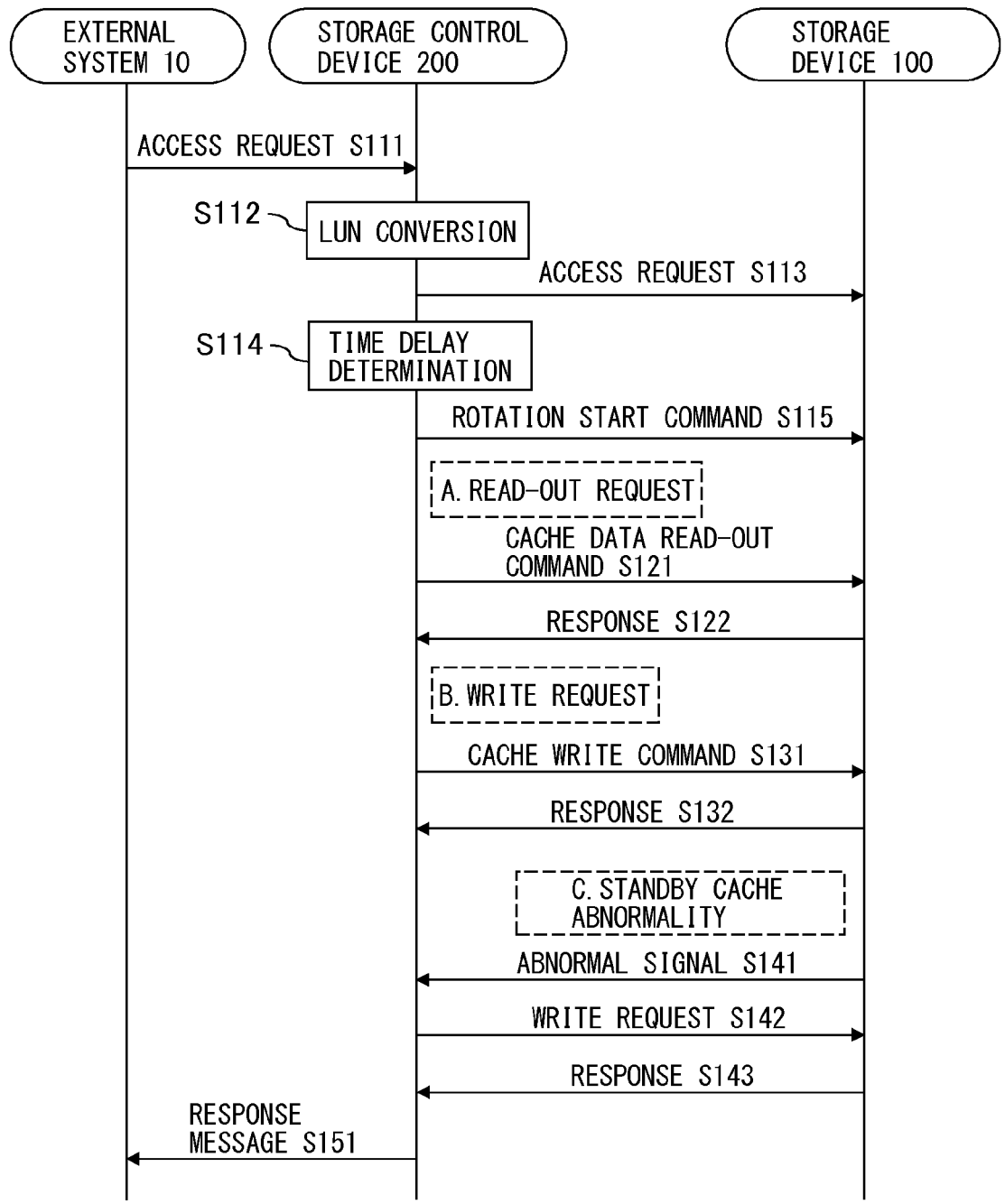
FIG. 4 is a sequence diagram depicting an example of a sequence of data communications between the storage control device and a storage device.

[2] Sequence of Data Communications Between Storage Control Device and Storage Device FIG. 4 is a sequence diagram depicting an example of a sequence of data communications between the storage control device and the storage device.

The storage control device 200 receives the access request including the LUN and the logical address from the external system 10 (S111). The storage control device 200 converts the LUN included in the access request into the LUN of the storage device 100 (S112). The storage control device 200 transmits the access request including the LUN of the storage device 100 to the storage device 100 (S113). When the response time of the active disk is longer than the response time delay which indicates the delay of the response time from the point of transferring the access request to the point of receiving the response thereof, the storage control device 200 transmits a start instruction command which instructs a start of rotation of the standby disk to the storage device 100 (S115).

A. Read-Out Request

When the access request is the read-out request, the storage control device 200 transmits a cache-data acquisition request to the storage device 100 (S121), and thereby it is possible to acquire data without waiting until the standby storage which has started the rotation becomes available. The storage device 100 transmits a response of the cache-data acquisition request to the storage control device 200 (S122).

B. Write Request

When the access request is the write request, the storage control device 200 transmits a cache write request to the storage device 100 (S131), and thereby it is possible to write data without waiting until the standby storage which has started the rotation becomes available. The storage device 100 transmits a response of the cache write request to the storage control device 200 (S132).

C. Abnormality on Standby Cache

When an abnormality occurs on the disk of the standby cache 130 or the like, the storage device 100 transmits an abnormality signal to the storage control device 200 (S141). The storage control device 200 transmits a write request to the storage device 100, and writes data to the standby cache which has started the rotation and has activated (S142). In this way, it is possible to write data even when the abnormality occurs in the standby cache 130.

The storage control device 200 which receives the response (S122, S132, or S143) transfers the response to the external system 10 (S151).

[3] Standby Disk Control of Storage Control Device

Figure 5:
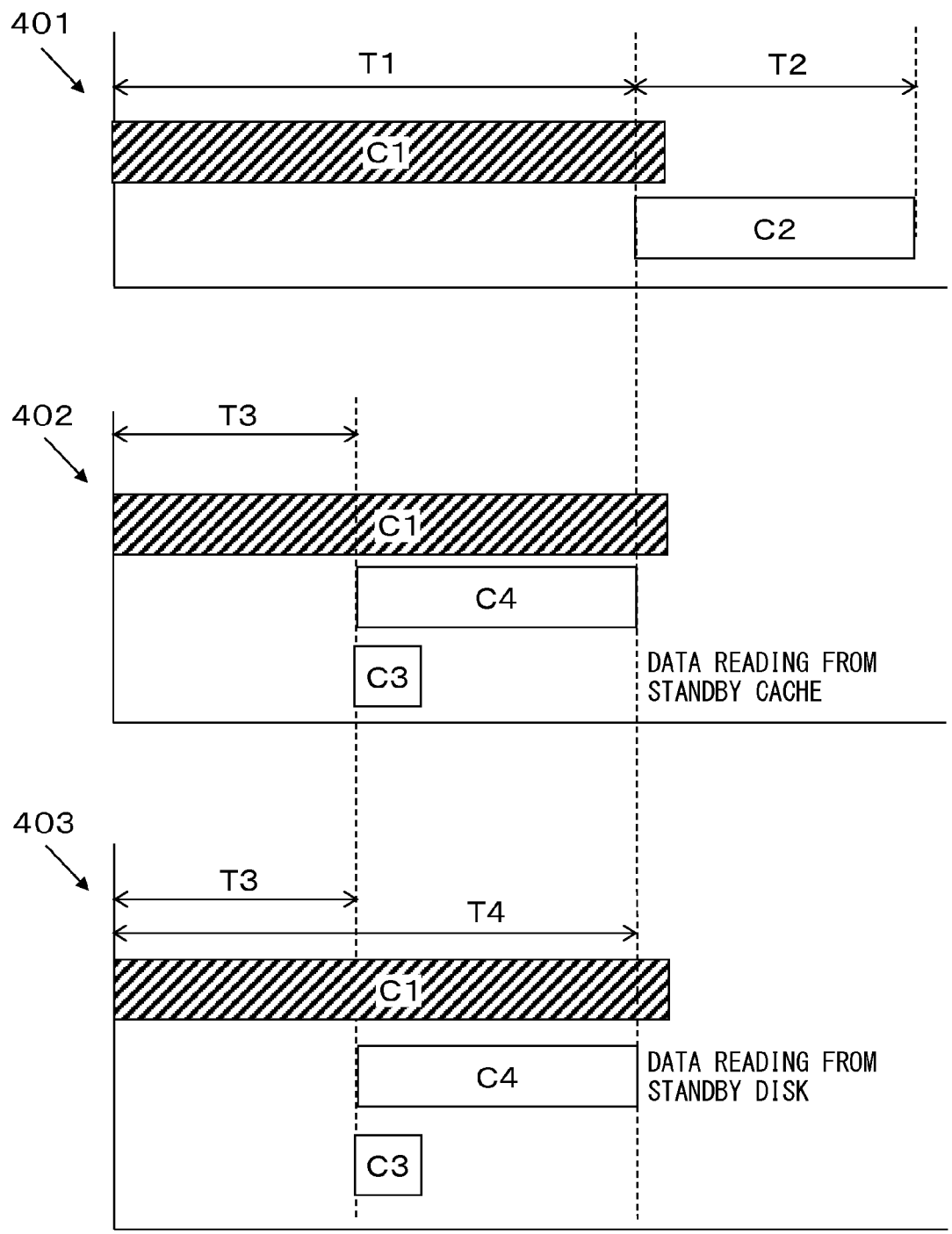
FIG. 5 is a time chart depicting an example of a disk rotation control of a standby disk in response to a read-out request.

FIG. 5 is a time chart depicting an example of a disk rotation control of the standby disk in response to the read-out request. A chart 401 depicts a case in which a rotation of the standby disk is started after detecting an error of the active disk. The C1 depicts the response time of the active disk to the access request from the external system 10. The time T1 is active disk abnormal time which indicates a threshold for determining a response abnormality. The active disk abnormal time is registered in the disk control information 310 mentioned below. Therefore, the storage control device 200 is able to determine the response abnormality by referring to the active disk abnormal time in the disk control information 310. The C2 depicts time from the point of starting the rotation of the standby disk to the point of becoming a steady rotation. The response from the standby disk is made after the C2 elapses. In the chart 401, since a rotation of the standby disk is started after detecting the error of the active disk, a delay time T2 occurs to the response to the external system 10.

A chart 402 depicted in FIG. 5 depicts a case in which the standby disk is rotated and object data is read from the standby cache 130 without waiting for elapsing of the judgment time of the response abnormality when the response of the active disk is delayed. The time T3 is an active disk response delay time used as a threshold for determining whether or not the response of the active disk is delayed. The active disk abnormal time is also registered in the disk control information 310 mentioned below. Therefore, the storage control device 200 is able to determine the response delay by referring to the active disk response delay time in the disk control information 310. The storage control device 200 instructs the storage device 100 to rotate the standby disk after the time T3 elapses, without waiting for elapsing of the judgment time of the response abnormality, when there is no response of the active disk within the period of time T3 from the storage device 100.

The C4 is processing time from the point of starting of the rotation of the standby disk to the point when the rotation becomes stable and data is readable. The storage control device 200 determines whether or not there is the object data in the standby cache 130, after starting the rotation of the standby disk. The C3 is the time for determining processing which determines whether or not there is the data in the standby cache 130. The chart 402 depicts the case in which there is request data in the standby cache 130, and the storage control device 200 reads the data from the standby cache 130, when the abnormality of the active disk is detected.

In a chart 403 depicted in FIG. 5, since there is no request data in the standby cache 130, data is read from the standby disk. In the chart 403, when the response of the active disk is delayed, the storage control device 200 rotates the standby disk without waiting for elapsing of the judgment time of the response abnormality, and object data is read from the standby disk when the abnormality of the active disk is detected. The C4 is processing time from the point of starting of the rotation of the standby disk to the point when the rotation becomes stable and data is readable.

In this way, according to the charts 402 and 403, when the response from the active disk to the access request from the external system 10 is delayed, the rotation of the standby disk is started, and thereby it is possible to reduce the response delay due to the activation of the standby disk after the active disk failure.

Figure 6:
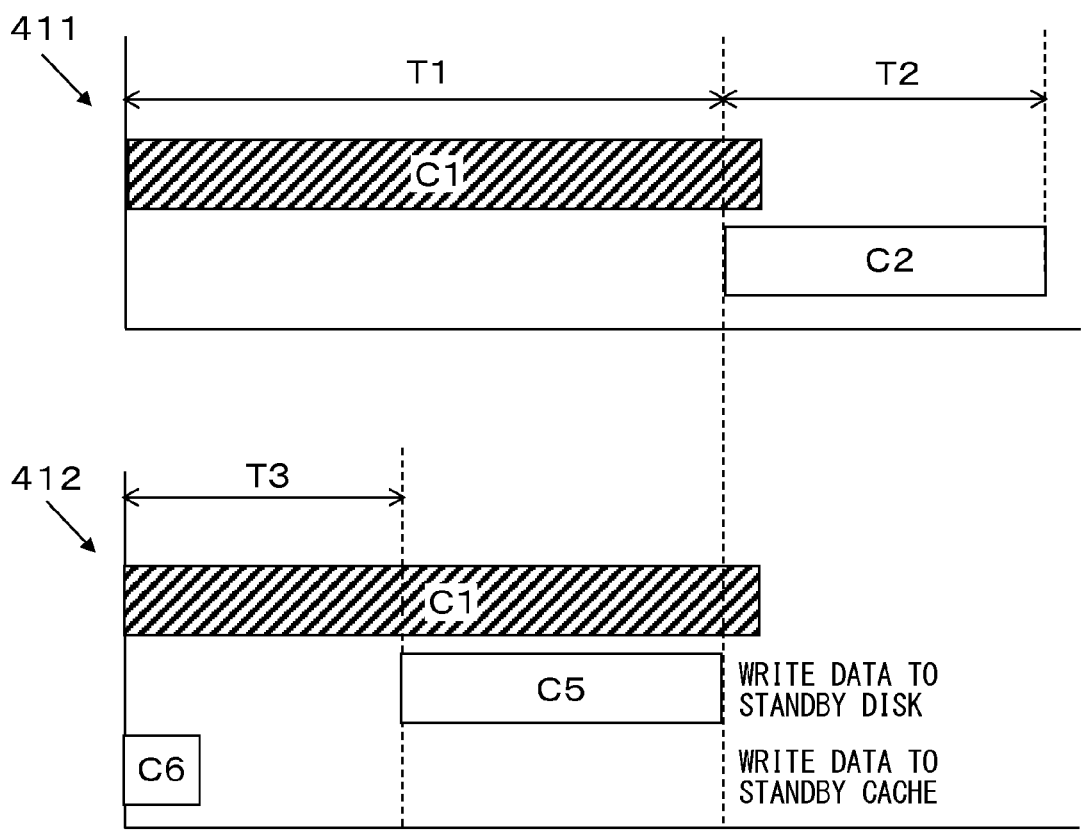
FIG. 6 is a time chart depicting an example of a disk rotation control of the standby disk in response to a write request.

FIG. 6 is a time chart depicting an example of a disk rotation control of a standby disk in response to the write request.

A chart 411 depicts a case in which the rotation of the standby disk is started after detecting an error of the active disk. The C1 depicts the response time of the active disk to the access request from the external system 10. The time T1 is used as a threshold for determining the response abnormality. The C2 depicts time from the point of starting the rotation of the standby disk to the point of becoming a steady rotation. The response from the standby disk is made after the C2 elapses. In the chart 411, since the rotation of the standby disk is started after detecting the error of the active disk, a delay time T2 occurs to the response to the external system 10.

A chart 412 depicts a case in which, when the response of the active disk is delayed, the standby disk is rotated without waiting for elapsing of the judgment time of the response abnormality, and the object data is written to the standby cache 130. The time T3 is used as a threshold for determining whether or not the response of the active disk is delayed. The C6 is time to write data in the standby cache 130. The storage control device 200 instructs the storage device to rotate the standby disk after the time T3 elapses, without waiting for elapsing of the judgment time of the response abnormality, when there is no response of the active disk from the storage device 100 within the period of time T3.

The storage control device 200 determines whether or not there is the object data in the standby cache 130 after starting the rotation of the standby disk. The C5 is processing time from the point of starting of the rotation of the standby disk to the point when the rotation becomes stable and data is writable. In the chart 412, the storage control device 200 writes data in the standby disk, when the abnormality of the active disk is detected.

In this way, according to the chart 412, when the response from the active disk to the access request which is from the external system 10 is delayed, the rotation of the standby disk is started, and thereby it is possible to reduce the response delay due to the activation of the standby disk after the active disk failure.

[4] Functions of Storage Control Device

Figure 7:
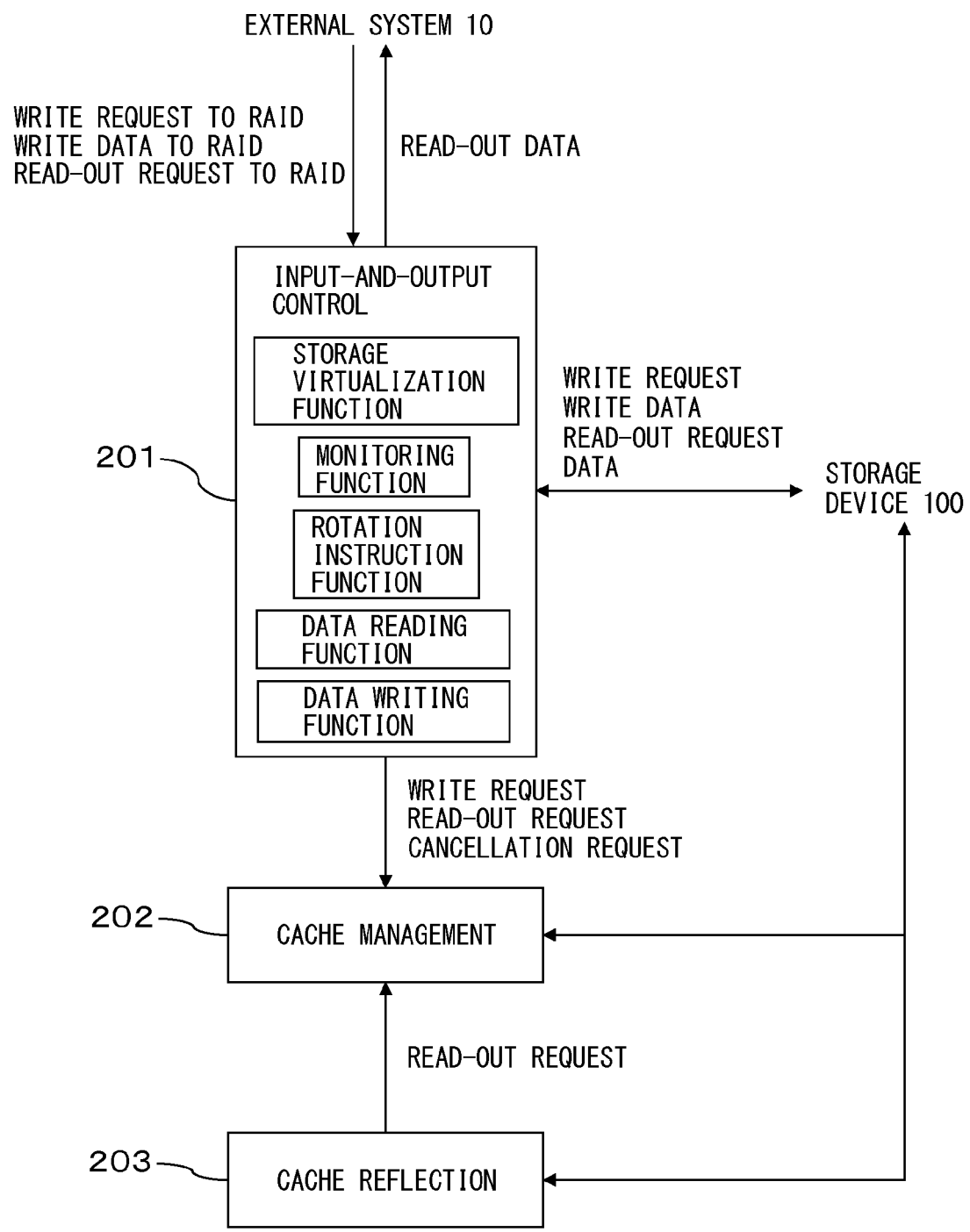
FIG. 7 is a diagram depicting an example of a functional configuration included in the storage control device.

The functions of the storage control device will be illustrated which realizes operations of the storage control device illustrated using FIG. 5 and FIG. 6. FIG. 7 is a diagram depicting an example of a functional configuration included in the storage control device. In FIG. 7, an input-and-output control function 201, a cache management function 202, and a cache reflection function 203 are depicted. The input-and-output control function 201, the cache management function 202, and the cache reflection function 203 correspond to the calculations by the control unit 260, and the control by the control unit 260 to the communication unit 240 or the storing unit 250 when describing by a hardware configuration. Therefore, since each function corresponds to the hardware of the storage control device 200, the communication between each function depicted in FIG. 7, and the external system 10 and the storage device 100 corresponds to the data communications between the storage control device 200, and the external system 10 and the storage device 100.

The input-and-output control function 201, the cache management function 202, and the cache reflection function 203 correspond to processes or threads generated by executing the program 990 by the control unit 260, when describing by a software configuration. Therefore, exchanges of the data between respective functions correspond to a transmission and a reception of messages between the processes or the threads. Hereinafter, each function will be illustrated.

A. Input-and-Output Control Function

The input-and-output control function is a function to process the read-out request or the write request to the disk transmitted from the external system 10 with reference to the mapping table 255, in addition to the above-mentioned virtualization function of the storage. The input-and-output control function includes a monitoring function which monitors the response time of the disk, a rotation control function which instructs the start of rotation of the standby disk illustrated using FIG. 5 and FIG. 6, a data reading function, and a data writing function.

The monitoring function monitors the response time of the active disk, which is from the point of transmitting the read-out request or the write request to the point of receiving the response. The rotation control function refers to the disk control information 310.

FIG. 8 is a diagram depicting an example of the disk control information. The disk control information 310 includes active disk abnormal time and active disk response delay time. With reference to the disk control information 310, in a rotation referential function, when the response time is longer than the active disk response delay time, a start of rotation of the standby disk is instructed.

Since the active disk response delay time is "5 seconds" in the example depicted in FIG. 8, the rotation control function of the storage control device 200 starts the rotation of the standby disk when the response from the active disk is delayed "5 seconds" or more, as illustrated using FIG. 5 and FIG. 6. Since the active disk abnormal time is "30 seconds" in the example depicted in FIG. 8, the rotation control function of the storage control device 200 determines that the active disk is "abnormal" when the response from the active disk is delayed "30 seconds" or more. Then, the storage control device 200 sets the state of the active disk in the below-mentioned disk control information 310 to be "abnormal", and stops an access to the active disk.

The data reading function identifies, when the read-out request including the LUN and the logical address is received from the external system 10, the storage device and the LUN which are destination of the read-out request with reference to the mapping table 255. The data reading function transmits the read-out request to the identified storage device. The data reading function transmits, when receiving read data from the storage device 100, the read data to the external system 10 as a response.

The data writing function identifies the storage device and the LUN which are destination of the write request with reference to the mapping table 255, when receiving the write data and the write request including the LUN and the logical address from the external system 10. The data writing function transmits the write data and the write request including the LUN and the logical address to the identified storage device.

The input-and-output control function 201 further outputs the write request, the read-out request, and a cancellation request to the cache management functions. Note that the cancellation request is a request for canceling an entry of the data written in the data disk 132 after performing a writing process of data into the standby disk and the data disk 132, due to a failure of the active disk.

Moreover, the input-and-output control function 201 avoids the access to the disk in which a failure occurs and starts the rotation of the standby disk which is in standby state, with reference to the disk state management information 330 stored in the storing unit 250.

FIG. 9 is a diagram depicting an example of the disk state management information. The disk state management information 330 depicted in FIG. 9 defines whether each of the states of the active disks and the standby disks, which constitute the RAID identified by an RAID number, is "normal" or "abnormal". The disk state management information 330 defines the RAID number 331, state information 332 of the active disk, state information 333 of the standby disk A, and state information 334 of the standby disk B, for each entry (row). For example, the active disk and the standby disk A which constitute the RAID with the RAID number "1" are "normal". The active disk is "abnormal", and the standby disks A and B are "normal", the respective disks constituting the RAID with the RAID number "2". The active disk and the standby disk A which constitute the RAID with the RAID number "3" are "normal".

In the example depicted in FIG. 9, since the state of the active disk in the entry for the RAID number "2" is "abnormal", the input-and-output control function 201 which has referred to the disk state management information 330 starts the rotation of the standby disk B to activate the standby disk B.

B. Cache Management Function

The cache management function 202 manages the data held in the standby cache 130 by associating the data with the standby disk in the data map management information 261. The cache management function 202 refers to the data map management information 261 to determine whether or not the data which is an object of the read-out request and the write request exists in the data disk 132.

FIG. 10 is a diagram depicting an example of the data map management information. The data map management information 261 defines a correspondence relation between the logical address in the data disk, and the logical address in the standby disk. As depicted in FIG. 10, the data map management information 261 includes an entry of data for each storing number 262. Data items of a start address 263 of the data disk, a RAID group number 264, a standby disk number 265, a start address 266 of the standby disk, and data length 267 are input for each entry.

The storing number 262 indicates a storing order of the data. The start address 263 of the data disk is a logical address in the data disk at the time of storing the data in the data disk 132. The RAID group number 136 is an RAID group number, the standby disk belonging to the RAID group. The standby disk number 265 is a serial number provided to the standby disk in the RAID group. The start address 266 of the standby disk is a start address of the data which is to be stored in the standby disk. The data length 267 is a data length of the data which is to be stored in the standby disk.

The cache management function 202 determines whether the data of the logical address designated by the write request has not been stored in the data disk 132, with reference to the data map management information 261. When the data of the logical address designated by the write request has not been stored in the data disk 132, the cache management function 202 adds the data to the data disk 132 and updates the data map management information 261 in the meta-disk 134 by the meta-information on the added data.

The cache management function 202 determines whether the data of the logical address designated by the write request has been stored in the data disk 132, with reference to the data map management information 261. The designated address for newly writing data is in the area in which data has been stored, the cache management function 202 overwrites the writing data in the same area, and does not change the data map management information 261.

When exceeding the area of the data disk 132, the meta-information which indicates the data of the existing data is cancelled, and the data map management information 261 is updated by new data.

When the data of the logical address designated by the read-out request has been stored in the data disk 132, the cache management function 202 acquires the logical address of the data disk 132 and data length from the meta-disk 134, and reads corresponding data from the data disk 132.

The cache management function 202 is able to search the logical address in the data disk 132 from the logical address of the standby disk.

The data map management information 261 may include a data structure by which high speed searching is possible in order to decrease the search time of the logical address of the standby disk based on the logical address of the data disk, or the search time of the logical address of the data disk based on the logical address of the standby disk.

FIG. 11 is a diagram depicting an example of the data map management information which includes data structure of a tree. The data map management information 261 depicted in FIG. 11 is configured by a plurality of nodes connected with branches. The 211 depicts the node with the RAID number "1" and the disk number "1". The node 212 depicts the start address of the standby disk, and the node 213 depicts the logical address of the storing number 1. In this way, since it is not necessary to search with respect to all the data map management information 261, using the data structure of B-tree for the data map management information 261 decreases an amount of search and reduces the access delay to the standby disk.

When the cache management function 202 receives a cancellation request to the logical address on the designated RAID, the cache management function 202 cancels the entry which is the object of the cancellation request from the data map management information 261. This process is used for cancelling the entry of the data concerned, if the data remains in the data disk, the data being directly written in the standby disk when the active disk fails. When receiving the read-out request from the cache reflection function, all information currently held in the meta-disk is extracted, and the data is returned in order.

Moreover, the cache management function 202 operates so that the data is not stored in an abnormal data disk with reference to the standby cache state management information 340.

Figure 12:
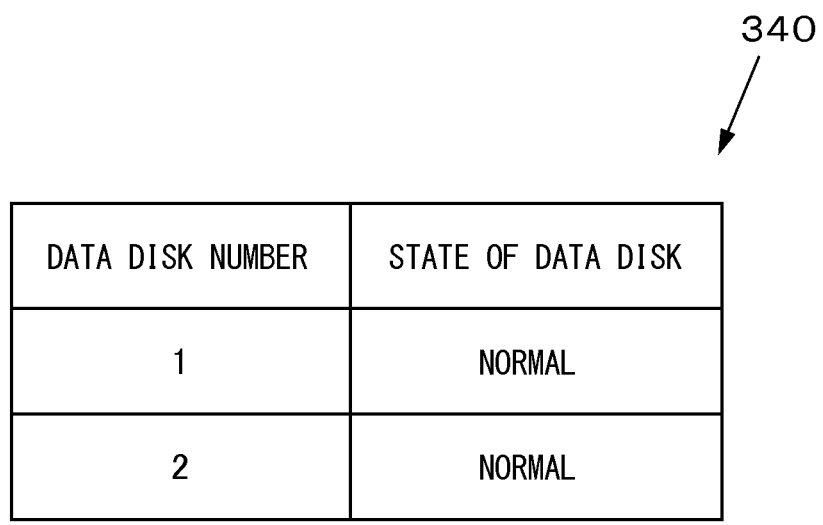
FIG. 12 is a diagram depicting an example of standby cache state management information.

FIG. 12 is a diagram depicting an example of the standby cache state management information. The standby cache state management information 340 depicted in FIG. 12 defines whether the state of the data disk identified by the data disk number is "normal" or "abnormal". The cache management function 202 operates so that the data disk, the state of which is "abnormal", is not accessed.

Figure 13:
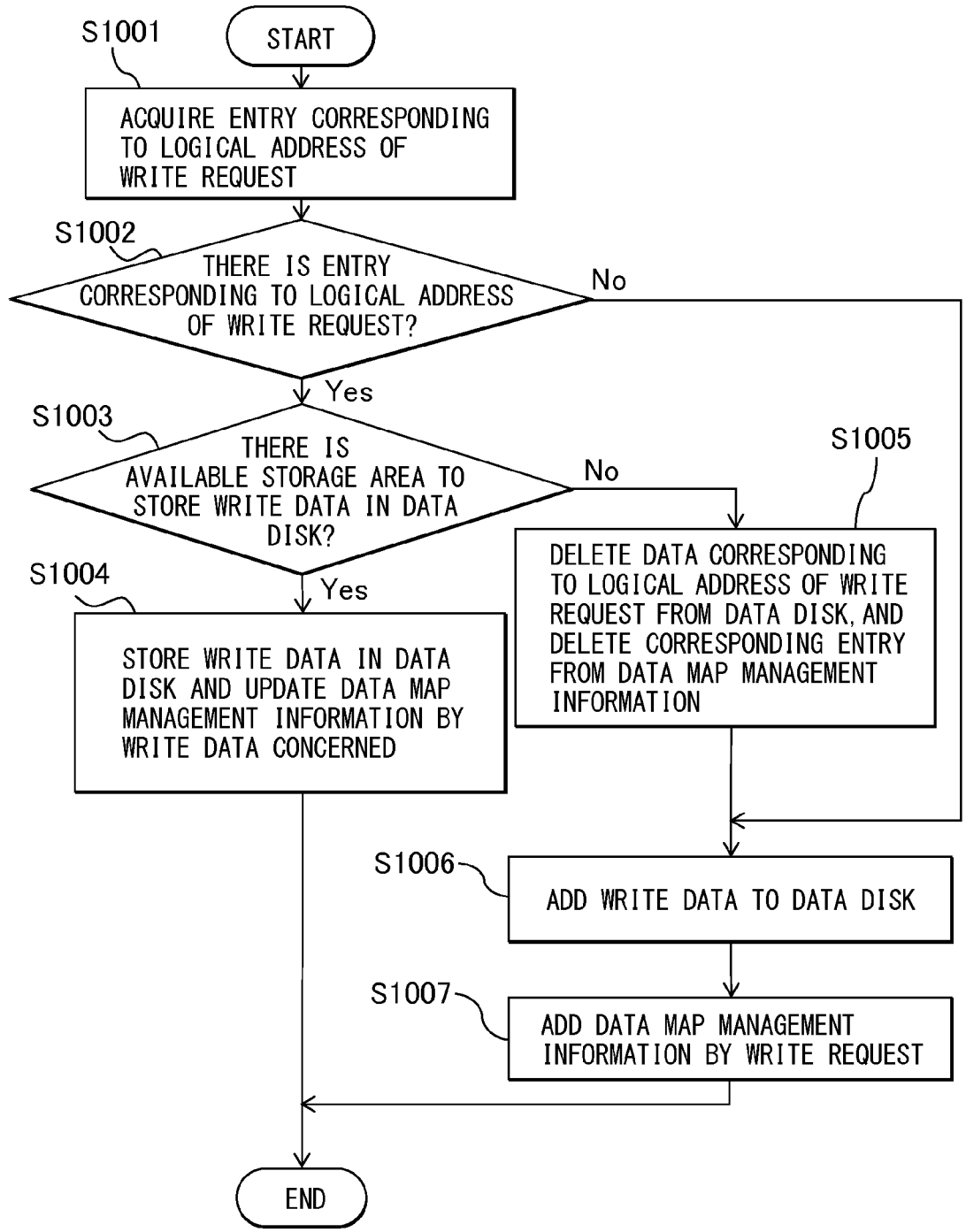
FIG. 13 is a flowchart depicting an example of processing which adds data to a data disk or updates the data according to the write request.

FIG. 13 is a flowchart depicting an example of processing which adds data to the data disk or updates the data according to the write request. When the storage control device 200 receives the write request and the write data from the external system 10, the storage control device 200 acquires the entry corresponding to the logical address of the write request from the data map management information 261 (S1001). When there is the entry corresponding to the logical address of the write request in the data map management information 261 (S1002: Yes), the storage control device 200 determines whether or not there is an available storage area to store the write data in the data disk 132 (S1003). When there is such available storage area (S1003: Yes), the storage control device 200 stores the write data in the data disk 132 and updates the data map management information 261 by the write data (S1004).

When there is no available storage area (S1003: No), the data corresponding to the logical address of the write request is deleted in the data disk 132, and a corresponding entry is deleted from the data map management information 261 (S1005). When there is no entry corresponding to the logical address of the write request (S1002: No), or after S1005, the write data is added to the data disk 132 (S1006). The storage control device 200 adds the data map management information 261 by the write request (S1007), and terminates the write process of data into the standby cache 130.

C. Cache Reflection Function

The cache reflection function 203 is a function which reflects, to the standby disk, a part of or all of contents in the standby cache 130 obtained from the cache management function, when predetermined conditions are satisfied. The cache reflection function 203 reflects the data in the standby cache 130 to the standby disk in accordance with the cache reflection information 320.

FIG. 14 is a diagram depicting an example of the cache reflection information. In the cache reflection information 320, data of an RAID group number 321 of the standby disk, a standby disk number 322, maximum capacitance 323 of the standby disk, IO time 324, and communication period of time 325 are input for each entry. Each of the maximum capacitance 323, the IO time 324, and the communication period of time 325 indicates the condition for the cache reflection.

The maximum capacitance 323 is a maximum threshold of the storing data amount for starting the data reflection to the standby disk from the standby cache 130. The IO time 324 indicates the period of time in which there is no I/O for the standby cache 130. The IO time 324 is the predetermined time in which the standby cache 130 is stopped. The communication period of time 325 is the period of time in which the communication path between the external system 10 and the storage control device 200 has light load.

The cache reflection function 203 determines whether the conditions are satisfied, for example whether the storing amount of the data disk exceeds the value "50%" of the maximum capacitance 323, whether it is in the period indicated by the IO time 324, and whether it is in the period indicated by the communication period of time 325. When all or any of the conditions are satisfied, the cache reflection function 203 reflects the held data in the standby cache 130 to the standby disk with respect to the disks of the RAID group concerned.

Figure 15:
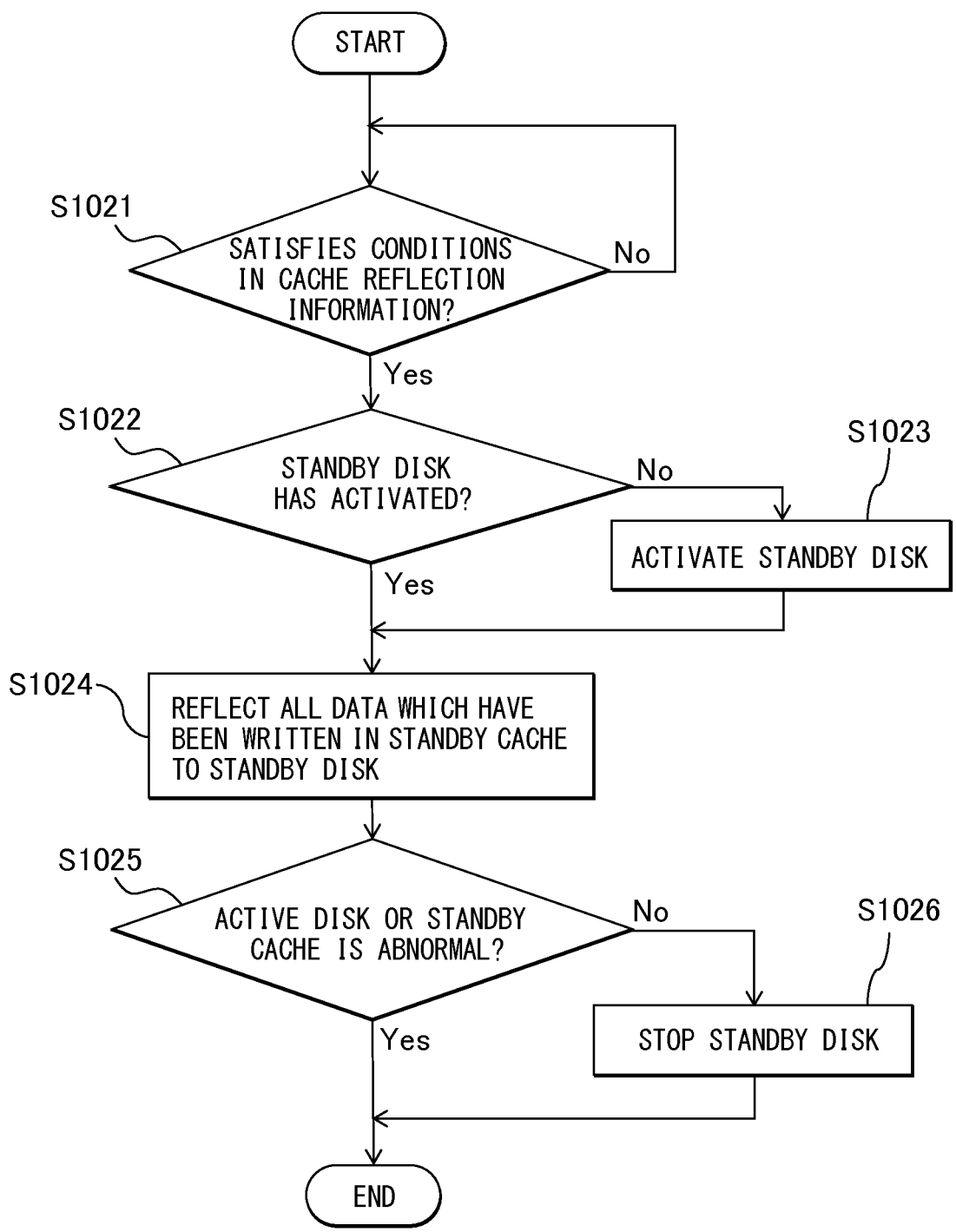
FIG. 15 is a flowchart depicting an example of cache reflection processing.

FIG. 15 is a flowchart depicting an example of the cache reflection processing. The cache reflection processing is processing performed when the active disk is operating normally and the standby disk has stopped, and performed when the active disk becomes abnormal and the standby disk is operating. By performing the cache reflection processing, the data which is held in the standby cache 130 but which is not held in the standby disk, the data being designated by the same logical address, is reflected to the standby disk.

The storage control device 200 determines whether or not the standby cache 130 satisfies the conditions included in the cache reflection information 320 (S1021). When the conditions in the cache reflection information 320 are satisfied (S1021: Yes), the storage control device 200 determines whether the standby disk has activated (S1022). When the standby disk has not activated (S1022: No), the rotation of the standby disk is started in order to reflect data (S1023). When the standby disk has activated (S1022: Yes), the storage control device 200 controls the storage device 100 so as to reflect all data which have written in the standby cache 130 to the standby disk (S1024). After finishing the reflection of the storing data in the standby cache 130 to the standby disk, the storage control device 200 determines whether or not the active disk or the standby cache 130 is abnormal (S1025). When the active disk and the standby cache 130 are not abnormal (S1025: No), the standby disk is stopped (S1026) and the cache reflection processing is terminated. When either the active disk or the standby cache 130 is abnormal (S1025: Yes), the cache reflection processing is terminated without stopping the standby disk.

Figure 16:
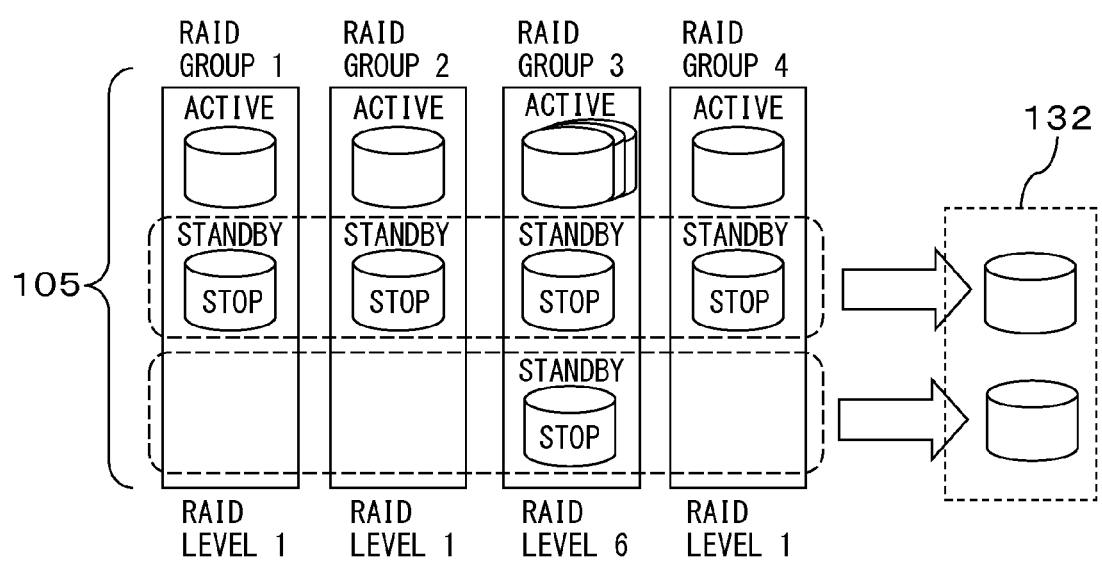
FIG. 16 is a diagram depicting a setting example of a data disk.

FIG. 16 is a diagram depicting a setting example of the data disk. In FIG. 16, the disk array unit 105 and the data disk 132 are depicted. In order to maintain the availability of the disk array unit, the number of data disks 132 is defined to be the maximum number of the standby disks within the numbers of the standby disks which constitute each RAID. In the example depicted in FIG. 16, the number of the standby disks for the RAID groups 3 with the RAID level 6 is "2", and therefore, the number of data disks 132 is also "2". According to such configuration, the data is able to be reflected to each standby disk from the data disk when reflecting data to the standby disk to be activated, and therefore it is possible to shorten the period for the data reflection to the standby disk. The capacitance of the data disk is set based on the data amount to be stored and the write amount of the reflection process which is in operation.

[5] Processing Flow of Storage Control Device

Figure 17:
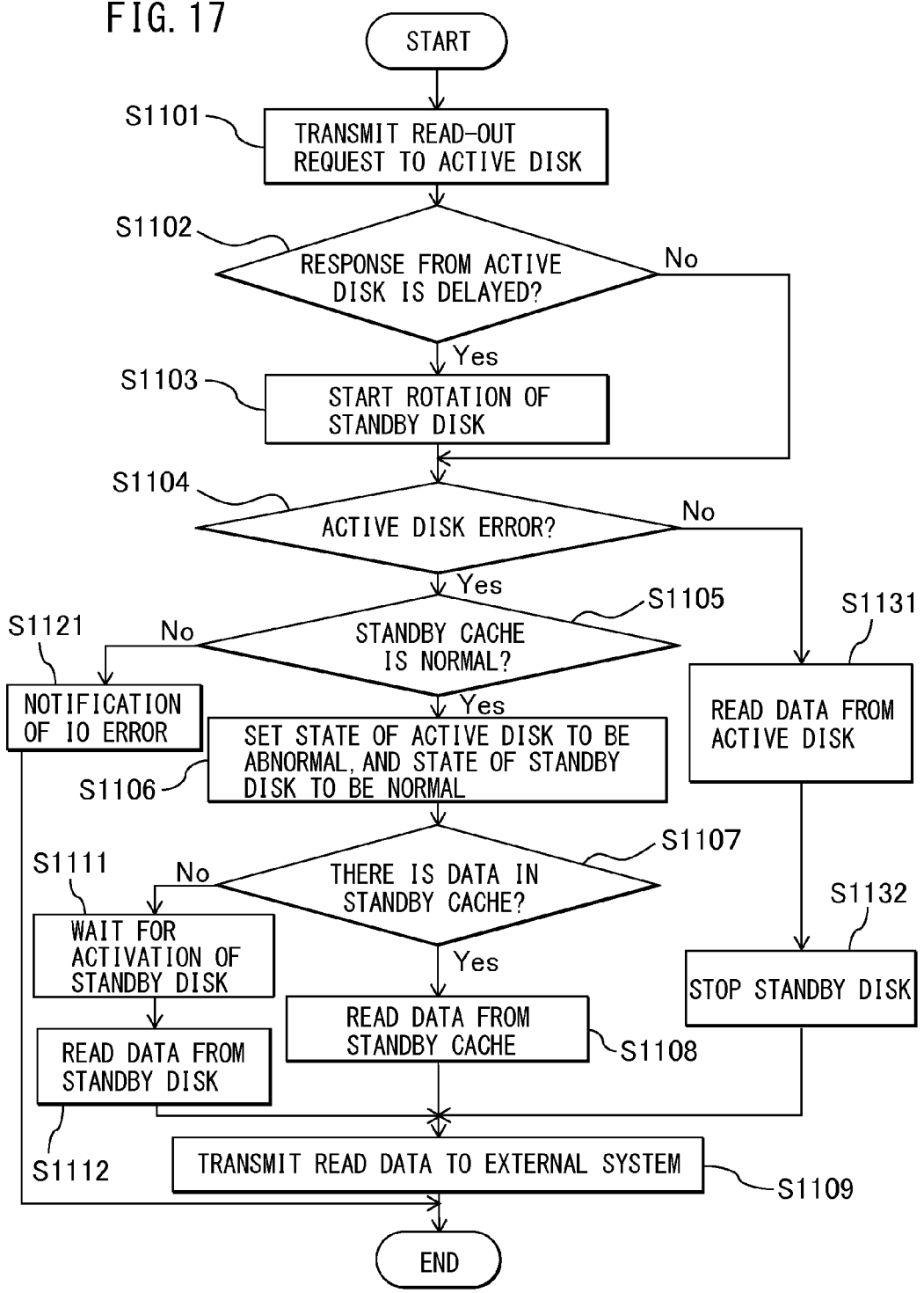
FIG. 17 is a flowchart depicting an example of operational processes when the active disk fails during a read-out request operation.

FIG. 17 is a flowchart depicting an example of processing of operation when the active disk fails during read-out request operation. First, the storage control device 200 transmits the read-out request received from the external system 10 to the storage device 100 (S1101). The storage control device 200 determines whether or not the response from the active disk is delayed (S1102). When the response is delayed (S1102: Yes), the storage control device 200 instructs the storage device 100 to start the rotation of the standby disk (S1103). When the response is not delayed (S1102: No), or after starting the rotation of the standby disk (S1103), the storage control device 200 determines whether or not an error has occurred on the active disk (S1104). When the error has occurred on the active disk (S1104: Yes), it is determined whether or not the standby cache 130 is normal (S1105). When the error has occurred on the standby cache 130 (S1105: No), the storage control device 200 notifies the external system 10 of an IO error (S1121), and terminates the processing. When the standby cache 130 is normal (S1105: Yes), the storage control device 200 sets the state of the active disk in the disk state management information 330 to be "abnormal", and the state of the standby disk to be "normal" (S1106).

The storage control device 200 determines whether or not there is data which is an object of read-out request in the standby cache 130 (S1107). When there is the data in the standby cache 130 (S1107: Yes), the storage control device 200 reads the data from the standby cache 130 (S1108). The storage control device 200 transmits the read data to the external system 10 (S1109), and terminates the processing.

By not reading the data from the standby disk but from the standby cache 130, it is possible to respond to the external system 10 before the rotation of the standby disk becomes stable.

When there is no data in the standby cache 130 (S1107: No), the storage control device 200 waits for the activation of the standby disk (S1111), and reads the data from the standby disk (S1112). The storage control device 200 transmits the read data to the external system 10 (S1109), and terminates the processing.

When the error does not occur on the active disk (S1104: No), the storage control device 200 reads the data from the active disk (S1131), and stops the standby disk in order to prevent power consumption (S1132). Next, the storage control device 200 transmits the read data to the external system 10 (S1109), and terminates the processing.

Figure 18:
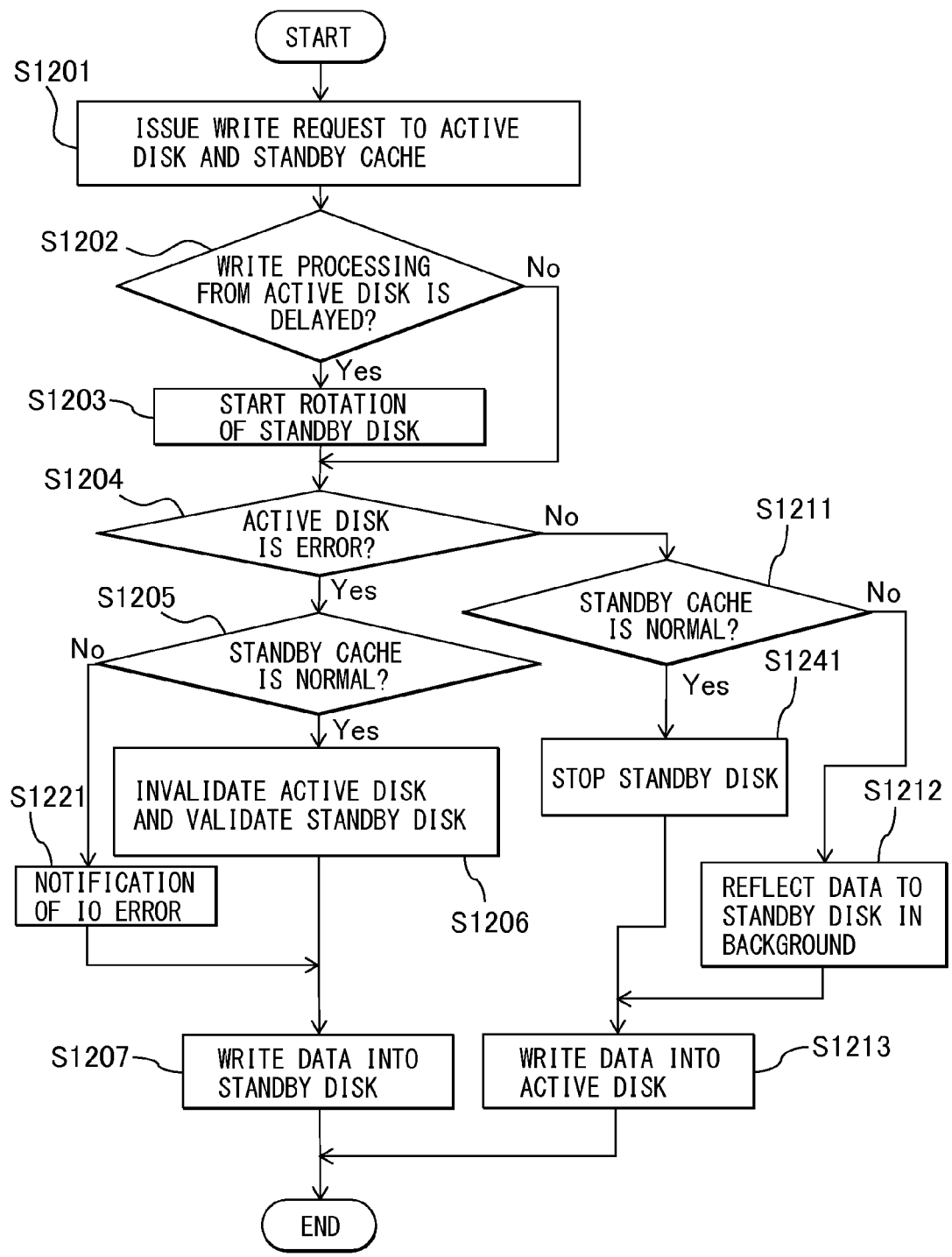
FIG. 18 is a flowchart depicting an example of operational processes when the active disk fails during a write request operation.

FIG. 18 is a flowchart depicting an example of processing of operation when the active disk fails during the write request operation. First, the storage control device 200 transmits the write request received from the external system 10 to the active disk of the storage device 100 (S1201). The storage control device 200 determines whether or not the response from the active disk is delayed (S1202). When the response is delayed (S1202: Yes), the storage control device 200 instructs the storage device 100 to start the rotation of the standby disk (S1203). When the response is not delayed (S1202: No), or after starting the rotation of the standby disk (S1203), the storage control device 200 determines whether or not an error has occurred on the active disk (S1204).

When the error has occurred on the active disk (S1204: Yes), it is determined whether or not the standby cache 130 is normal (S1205). When the error has occurred on the standby cache 130 (S1205: No), the storage control device 200 notifies the external system 10 of an IO error (S1221). Then, the storage control device 200 writes the data into the standby disk (S1207), and terminates the processing.

When the error has occurred on the active disk (S1204: Yes) and the standby disk is normal (S1205: Yes), the storage control device 200 sets the state of the active disk in the disk state management information 330 to be "abnormal", and the state of the standby disk to be "normal" (S1206). Then, the storage control device 200 writes the data into the standby disk (S1207), and terminates the processing.

When the active disk is normal (S1204: No), the storage control device 200 determines whether or not the standby cache 130 is normal (S1211). When the error has occurred on the standby cache 130 (S1211: No), the storage control device 200 reflects the data in the standby cache 130 to the standby disk in the background (S1212). The storage control device 200 writes the data to the active disk (S1213), and terminates the processing.

When the active disk is normal (S1204: No) and the standby disk is abnormal (S1211: Yes), the storage control device 200 stops the standby disk for reducing power consumption (S1241), writes the data to the active disk (S1213), and terminates the processing.

[6] Modification of Storage Device

Figure 19:
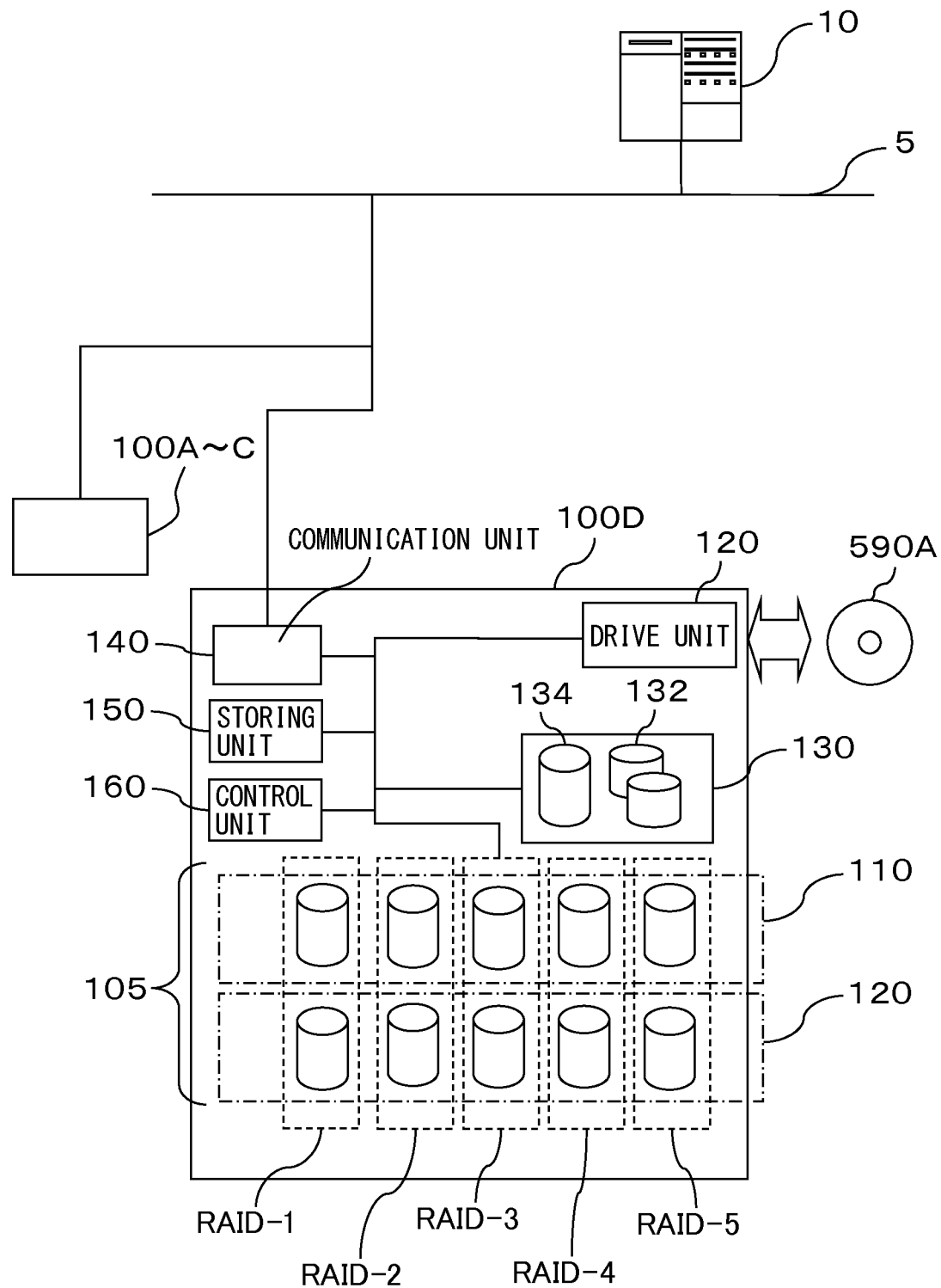
FIG. 19 is a diagram depicting a modification of a storage device.

FIG. 19 is a diagram depicting a modification of the storage device. A storage device 100D in the modification depicted in FIG. 19 directly receives the write request and the read-out request from the external system 10 without passing through the storage control device 200. The storage device 100D reads the program 990A stored in a recording medium 590A from the drive unit 120, and stores the program into the storing unit 150. By executing the program 990A stored in the storing unit 150 by the control unit 160, the storage device 100D realizes the input-and-output control function excluding the virtualization function of the storage illustrated in FIG. 7, the cache management function, and the cache reflection function, and performs a disk rotation control for the standby disk which is illustrated in FIG. 6 and FIG. 7.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device configured to control a storage device including a first disk which is in active state and a second disk which is in standby state, the storage control device comprising:
   a communication unit configured to transmit a read-out request or a write request to the storage device and receives a response to the read-out request or the write request from the storage device; and
   a control unit configured to control the communication unit so that the communication unit transmits a rotation start command which instructs a start of rotation of the second disk to the storage device, when a first time period, which is measured from when the read-out request or the write request is transmitted to the first disk which is in active state until when the response is received from the first disk, is longer than a predetermined threshold, after the start of rotation of the second disk, the control unit being configured to control the communication unit so that the communication unit transmits an access stop command which instructs a stop of access to the first disk by the storage device, when an error of the first disk is detected, and the control unit being configured to control the communication unit so that the communication unit transmits a rotation stop command which instructs a stop of rotation of the second disk to the storage device, when the error of the first disk is not detected, wherein the predetermined threshold is shorter than a period of judging the error of the first disk which is in active state.

2. The storage control device according to claim 1, wherein the storage device includes a cache unit holding data which is stored in the first disk being in active state but is not stored in the second disk being in standby state, and
   when the first time period is longer than a response delay time, the control unit further controls the communication unit to transmit a cache data read-out command to the storage device which instructs the storage device to read the data from the cache unit.

3. The storage control device according to claim 2, wherein when the data corresponding to the read-out request is not held in the cache unit, and when the first time period is longer than the response delay time, the control unit controls the communication unit so as to read the data from the second disk being in active state by the start of the rotation, to read the data from the second disk.

4. The storage control device according to claim 1, the storage control device further comprising:
   a cache unit configured to hold data which is stored in the first disk being in active state but is not stored in the second disk being in standby state, and
   a cache management unit configured to read, when the first time period is longer than a response delay time, the data corresponding to the read-out request from the cache unit.

5. The storage control device according to claim 4, the storage control device further comprising:
   a data read-out unit configured to read the data from the second disk being in active state by the start of the rotation, when the data corresponding to the read-out request is not held in the cache unit, and when the first time period is longer than the response delay time.

6. A storage system comprising:
a storage device including a first disk which is in active state and a second disk which is in standby state; and
a storage control device, the storage control device comprising:
a communication unit configured to transmit a read-out request or a write request to the storage device and receives a response to the read-out request or the write request from the storage device; and
a control unit configured to control the communication unit so that the communication unit transmits a rotation start command which instructs a start of rotation of the second disk to the storage device, when a first time period, which is measured from when the read-out request or the write request is transmitted to the first disk which is in active state until when the response is received from the first disk, is longer than a predetermined threshold, after the start of rotation of the second disk, the control unit being configured to control the communication unit so that the communication unit transmits an access stop command which instructs a stop of access to the first disk by the storage device, when an error of the first disk is detected, and the control unit being configured to control the communication unit so that the communication unit transmits a rotation stop command which instructs a stop of rotation of the second disk to the storage device, when the error of the first disk is not detected, wherein the predetermined threshold is shorter than a period of judging the error of the first disk which is in active state.

7. A non-transitory computer readable medium for storing a storage device control program of controlling a storage device including a first disk which is in active state and a second disk which is in standby state, the storage device control program causing a computer to execute:
transmitting a read-out request or a write request to the storage device; and
instructing a start of rotation of the second disk, when a first time period, which is measured from when the read-out request or the write request is transmitted to the first disk which is in active state until when the response is received from the first disk, is longer than a predetermined threshold, after the start of rotation of the second disk, instructing a stop of access to the first disk, when an error of the first disk is detected, and instructing a stop of rotation of the second disk to the storage device, when the error of the first disk is not detected, wherein the predetermined threshold is shorter than a period of judging the error of the first disk which is in active state.

8. The non-transitory computer readable medium according to claim 7, wherein
the storage device includes a cache unit holding data which is stored in the first disk being in active state but is not stored in the second disk being in standby state, and
the program causes a control unit to control, when the first time period is longer than a response delay time, a communication unit to transmit a cache data read-out command to the storage device which instructs the storage device to read the data from the cache unit.

9. The non-transitory computer readable medium according claim 8, wherein the program causes the control unit to control, when the data corresponding to the read-out request is not held in the cache unit, and when the first time period is longer than the response delay time, the communication unit so as to read the data from the second disk being in active state by the start of the rotation, to read the data from the second disk.

10. The storage system according to claim 6, wherein
the storage device includes a cache unit holding data which is stored in the first disk being in active state but is not stored in the second disk being in standby state, and
when the first time period is longer than a response delay time, the control unit further controls the communication unit to transmit a cache data read-out command to the storage device which instructs the storage device to read the data from the cache unit.

11. The storage system according to claim 10, wherein when the data corresponding to the read-out request is not held in the cache unit, and when the first time period is longer than the response delay time, the control unit controls the communication unit so as to read the data from the second disk being in active state by the start of the rotation, to read the data from the second disk.

* * * * *